United States Patent [19]

Mochizuki et al.

[11] Patent Number: 4,626,082

[45] Date of Patent: Dec. 2, 1986

[54] PROJECTING DEVICE

[75] Inventors: Noritaka Mochizuki, Yokohama; Setsuo Minami, Kawasaki; Yoshiya Matsui, Yokohama; Tadasu Taniguchi, Tokyo, all of Japan

[73] Assignee: Canon Kabushiki Kaisha, Tokyo, Japan

[21] Appl. No.: 647,270

[22] Filed: Sep. 4, 1984

Related U.S. Application Data

[63] Continuation of Ser. No. 173,918, Jul. 31, 1980, abandoned.

[30] Foreign Application Priority Data

Aug. 10, 1979 [JP] Japan .................................. 54-102493
Nov. 29, 1979 [JP] Japan .................................. 54-154730
Dec. 24, 1979 [JP] Japan .................................. 54-168484
Dec. 27, 1979 [JP] Japan .................................. 54-172404

[51] Int. Cl.$^4$ ............................................. G02B 13/26
[52] U.S. Cl. ..................................................... 350/573
[58] Field of Search ................. 350/467, 656, 96.24, 350/96.25, 96.29, 572, 573; 355/1

[56] References Cited

U.S. PATENT DOCUMENTS

| 3,241,438 | 3/1966 | Frank | 355/50 |
| 3,409,354 | 11/1968 | Frank | 355/1 |
| 3,556,635 | 1/1971 | Schrenk et al. | 350/96.24 |
| 3,580,675 | 5/1971 | Hieber et al. | 355/50 |
| 3,584,952 | 6/1971 | Gundlach | 355/52 |
| 3,592,542 | 7/1971 | Kaufer et al. | 355/50 |
| 3,977,777 | 8/1976 | Tanaka et al. | 355/1 |
| 4,059,345 | 11/1977 | Kawamura et al. | 355/1 |
| 4,168,900 | 9/1979 | Adachi | 355/1 |

FOREIGN PATENT DOCUMENTS

| 0003557 | 1/1979 | Japan | 350/96.24 |
| 1254450 | 11/1971 | United Kingdom . | |
| 1322880 | 7/1973 | United Kingdom . | |
| 1321891 | 7/1973 | United Kingdom . | |

Primary Examiner—Bruce Y. Arnold
Attorney, Agent, or Firm—Fitzpatrick, Cella, Harper & Scinto

[57] ABSTRACT

A projecting device comprising an array of axial element lens systems, wherein each element lens system includes a single bar lens having an axial length larger than the effective aperture and adapted to form an intermediate image of a pixel of the object plane and an erect image of a magnification of unity not vertically nor laterally inverted in such a manner that the light intensity on the image plane corresponding to said pixel is defined in the form of Gaussian distribution by the eclipse of the aperture. The element lens systems are arranged in a plane perpendicular to the optical axis so as to cause the light intensity distributions of said systems to mutually overlap in the peripheral areas thereof on the image plane, wherein each row of the systems in the array is displaced by a half pitch with respect to the neighboring row to constitute a staggered arrangement thereby achieving a uniform exposure distribution, integrated in time, in the scanning direction.

11 Claims, 13 Drawing Figures

PROJECTING DEVICE

This application is a continuation of application Ser. No. 173,918 filed July 31, 1980, now abandoned.

BACKGROUND OF THE INVENTION

1. Field of the Invention

This invention relates to a projecting device.

2. Description of the Prior Art

There is already known the use of a so-called compound lens system, composed of a plurality of optical systems, each capable of projecting a partial area or a pixel (picture element) of the object onto a determined partial area of the image plane (such system being hereinafter referred to as a plural element lens system) arranged in a plane perpendicular to the optical axis and along a determined direction, for example, along the slit employed in a copier utilizing the slit-exposure process for the purpose of reducing the conjugate distance from the object plane to the image plane and thus rendering the entire apparatus of the copier more compact.

Such an element lens system is already disclosed, for example in the U.S. Pat. No. 3,592,542 as a system composed of three axially arranged lenses, or in U.S. Pat. No. 3,584,952 as a system composed of three axially arranged lenses (in these systems the central lens functioning as a field lens), or in Japanese Patent Laid-Open Sho 53-122426 corresponding to the U.S. patent application Ser. No. 889,404, now abandoned, as a system composed of two bar lenses having axial lengths larger than the effective aperture and in which the central air layer functions as an air field lens. Although these known lenses are advantageous in effectively transmitting the light to the image plane by the function of said field lens, they are still defective in that they require delicate optical adjustment for the eventual eccentricity of two or three lenses arranged in the axial direction and the dust present in the vicinity of the field lens is projected on the final image plane to form a noise in the obtained image.

In U.S. Pat. No. 3,580,675 there is disclosed an element lens system composed of a single oblong lens which does not form an intermediate image in the scanning direction in a plane perpendicular to the optical axis but does form an intermediate image in the array direction orthogonal to said scanning direction, thus forming a final image erect only in one direction. The element lens system of the present invention is, however, different in that it forms an intermediate image both in the scanning direction and in the array direction in a plane perpendicular to the optical axis, thus forming a final image erect in both directions.

The element lens system of the present invention is also different from that obtainable from the combination of U.S. Pat. Nos. 3,580,675 and 3,592,542 in the manner explained in the following.

The element lens system disclosed in U.S. Pat. No. 3,592,542 shows, as represented in FIG. 6 thereof, a substantially rectangular light intensity distribution practically without the effect of the eclipse of aperture, except for the effect of the cosine the 4th-power rule, because of the presence of a complete field lens. Stated differently, the obtained light intensity distribution is substantially represented by a determined bias amount overlapped with the effect of the cosine to the 4th-power rule, etc. In the case of arranging a plural number of such element lens systems in a row with a given pitch and further arranging a plural number of such rows in a staggered fashion mutually displaced by a half pitch, a very accurate arrangement of the pitch, with very difficult adjustment is required, in order to obtain a uniform exposure integrated in time, in the scanning direction.

In addition to the aforementioned transmission-type optical systems, there is also known a reflection-type element lens system composed of a single bar lens as disclosed in Japanese Patent Laid-Open Sho 54-54057 corresponding to U.S. patent application Ser. No. 949,047 now abandoned. Such an element lens system, however, requires a difficult optical adjustment between the bar lens and the associated mirror.

SUMMARY OF THE INVENTION

The object of the present invention is to provide a projecting device which is compact in size and provides a uniform exposure distribution with a simple optical adjustment. The above-mentioned object is achieved by employing element lens systems lenses each including a single bar lens and having an axial length larger than the effective aperture each lens system lens is adapted for forming an intermediate inverted image within itself and for projecting an erect image having a magnification of unity onto the image plane each a pixel of the image plane having a Gaussian distribution of light intensity thereon. The element lens system lenses are arranged in rows with a determined pitch in a plane perpendicular to the optical axis, and the rows are mutually displaced by a half pitch to constitute a so-called staggered arrangement.

DESCRIPTION OF THE PREFERRED EMBODIMENTS

Figure 1:
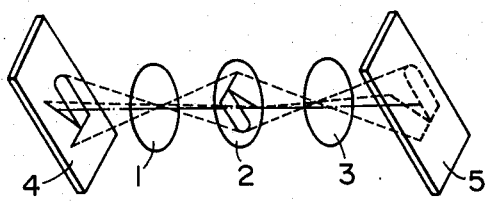
FIGS. 1 to 3 are schematic views of conventional element lens systems.
Figure 2:
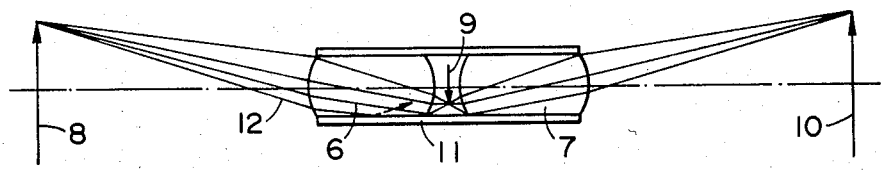
Figure 3:
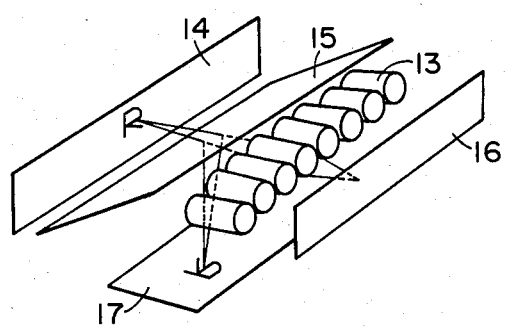

FIGS. 1 to 3 illustrate conventional element lens systems. In FIG. 1 an object 4 is projected as an erect image 5 of a magnification of unity by means of lenses 1, 2 and 3, in which the lens 2 functions as a field lens where an inverted intermediate image is formed. In the lens system shown in FIG. 2, an object 8 is at first focused as an inverted intermediate image 9 and further projected as an erect image 10 of a magnification of unity by means of bar lenses 6, 7 of an axial length larger than the effective aperture. A ray 12 exceeding said effective aperture is absorbed by an absorbing layer 11 extended in the axial direction and is therefore not transmitted to the image plane. The light intensity distribution on the image plane is thus defined by the eclipse of the aperture.

In the lens system shown in FIG. 3, an object 14 is projected as an image 17 through bar lenses 13, a mirror 16 and a bear splitter 15. The bar lens 13 and the mirror 16 are so arranged as to constitute a system equivalent to the system of lenses 6 and 7 shown in FIG. 2.

Figure 4:
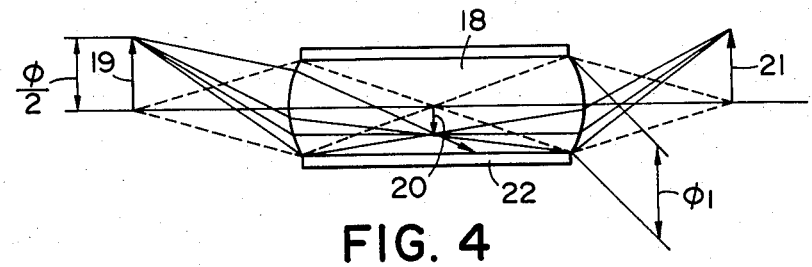
FIG. 4 is an optical explanatory view of the element lens system of the present invention.
Figure 5:
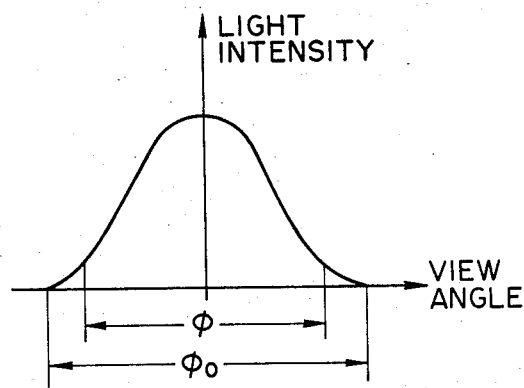
FIG. 5 is a view showing the light intensity distribution of the element lens system of the present invention.
Figure 6:
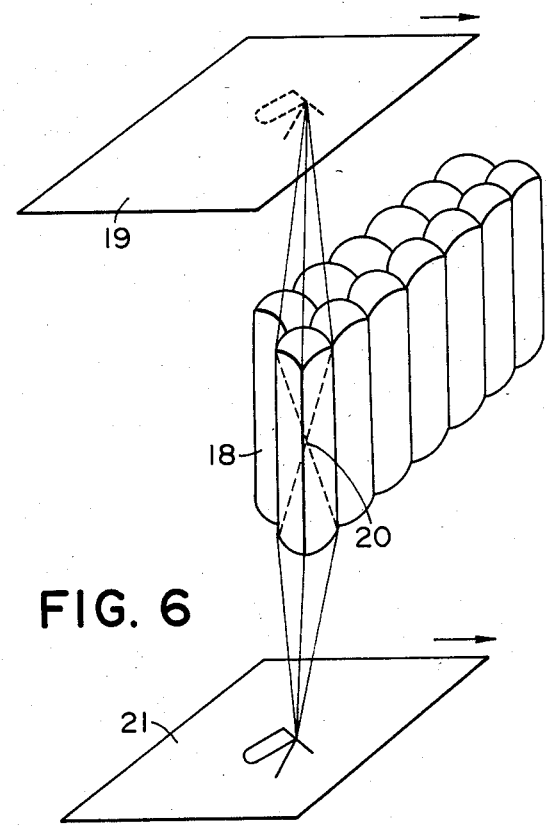
FIG. 6 is a schematic view of the projecting device composed of a staggered arrangement of the element lens systems of the present invention.

FIG. 4 schematically illustrates the element lens system of the present invention, wherein the effective aperture of the bar lens 18 substantially coincides with the internal diameter of an absorbing layer 22. In the following explanation it is assumed that said effective aperture is equal to the external diameter of the lens, but a comparable performance is obtainable even if the external diameter of the lens is larger than the effective aperture as long as the two can be considered substantially identical. The bar lens 18 has an axial length of the order of the combined length of the lenses 6 and 7 in FIG. 2 and thus is larger than the effective aperture. An object 19 is at first focused as an inverted intermediate image 20 at the axial center of said bar lens 18 and is finally projected onto the image plane as an erect image 21 having a magnification of unity. The light beam from the object 19 is refracted by the first face of the bar lens 18 to converge onto the intermediate image plane, then diverges therefrom and is again refracted by the second face of said bar lens 18 to converge on onto the image plane. The solid angle of the light beam converging onto the image plane is largest on the optical axis, gradually decreases as the beam is diverted from the optical axis, as represented by $\phi$ in FIG. 5, and finally becomes equal to zero at the end of the effective view angle. In this manner the eclipse of the aperture increases with the increase of the imaging angle and reaches 100% at the boundary of the effective view field where the light beam contributing to the imaging becomes zero. FIG. 5 shows the light intensity distribution in the image plane. In the case where the object has a uniform brightness distribution, the light intensity on the image plane assumes a Gaussian distribution because of the above-mentioned eclipse of the aperture. In FIG. 5 the ordinate represents the light intensity while the abscissa represents the image angle, or the image height corresponding to the vertical distance from the optical axis.

In the case where the lens is symmetrical to the left and to the right, a ray bisecting the angle of the light beam contributing to the imaging, said ray being defined as the principal ray, passes through the bar lens parallel to the optical axis. Consequently the light beam contributing to the imaging on the image field side becomes symmetrical to that on the object field side.

In order to obtain a desired light intensity distribution in the image plane by means of the ideal eclipse of the aperture, it becomes necessary to prevent the transmission of light from outside the effective aperture area of the lens into the image plane. For this purpose, outside the effective aperture of the bar lens 18, there is provided an absorbing layer 22 for dissipating the light beam exceeding the effective aperture area. Said light absorbing layer 22 may be of a type effecting light absorbing on the surface thereof or effecting light absorption during the course of light transmission therein. The light absorption of the former type is achievable, for example, with black paint or a lens tube provided around the lens, while the light absorption of the latter type is achievable, for example, by means of a combination of a plastic lens and an absorbing layer of a black acrylic resin having substantially the same refractive index as the bar lens for reducing the internal reflection at the boundary. Also a light diffusing face can substantially serve as such absorbing layer.

There will be now explained the parameters of the bar lens 18, which should preferably satisfy the conditions represented by the following equations (4) to (7). It is to be assumed that the radius of curvature of the first face at the object field side of the bar lens 18 is $r_1$; the radius of curvature of the second face thereof at the image field side is $r_2$ (negative in the illustrated case); the axial lens thickness or the distance between the first and second faces along the optical axis is $d$; the refractive index is $n$; the effective aperture of the lens is $\phi_1$; the maximum diameter of the effective object field is $\phi_0$; the distance from the first face of said bar lens 18 to the object 19 is $S_1$ (negative in the illustrated case); and the effective F-number at the object field side is $F_e$. $F_e$, $S_1$, $n$ and $\phi_0$ are parameters determinable in advance, from which there can be determined other parameters $r_1$, $r_2$, $d$ and $\phi_1$ according to the ideal imaging theory.

In the first place, from the definition of the F-number there can be obtained the following equation:

$$F_e = \frac{\sqrt{S_1^2 + \left(\frac{\phi_1}{2}\right)^2}}{\phi_1} \tag{1}$$

Also the paraxial imaging theory in an erect imaging system of a magnification of unity leads to the following equation:

$$\alpha_1 e' + \phi_1 e' = 2 \tag{2}$$

Considering the ease of the manufacture of the lens, it is assumed that the first and second faces have a same refractive power. In the foregoing equation (2) $\alpha_1$ is the converted inclination angle at the object field side, $\psi_1$ is the refractive power of the first face, and $e' \equiv d/n$.

Further there is obtained the following equation from the condition that the effective aperture becomes zero at the maximum image angle:

$$\frac{1}{S_1}\left(\frac{\phi_0}{2} - \frac{\phi_1}{2}\right) \times \frac{1}{\frac{\phi_1}{2}} = \psi_1 \tag{3}$$

wherein $\phi_0 > 0$ and $\phi_1 < 0$.

The foregoing equations (1), (2) and (3) can be solved in combination to obtain:

$$\phi_1 = \frac{-S_1/F_e}{\sqrt{1 - \left(\frac{1}{2F_e}\right)^2}} \tag{4}$$

$$r_1 = \frac{n-1}{\frac{1}{S_1}\left(\frac{\phi_0}{2} - \frac{\phi_1}{2}\right) \times \frac{1}{\frac{\phi_1}{2}}} \tag{5}$$

$$r_2 = -r_1 \tag{6}$$

-continued $$d = 2nS_1 \left( \frac{\phi_1}{\phi_0} \right) \qquad (7)$$

Furthermore, the present inventors have verified that the desired optical performance is obtainable even if the above-mentioned parameters are deviated from the foregoing definitions by ±10%, namely as long as the following relations are satisfied:

$$K_1 \times \frac{n-1}{\frac{1}{S_1}\left(\frac{\phi_0}{2} - \frac{\phi_1}{2}\right) \times \frac{1}{\frac{\phi_1}{2}}} < r_1 < K_2 \times$$

$$\frac{n-1}{\frac{1}{S_1}\left(\frac{\phi_0}{2} - \frac{\phi_1}{2}\right) \times \frac{1}{\frac{\phi_1}{2}}}$$

$$-K_2 \times \frac{n-1}{\frac{1}{S_1}\left(\frac{\phi_0}{2} - \frac{\phi_1}{2}\right) \times \frac{1}{\frac{\phi_1}{2}}} < r_2 < -K_1 \times$$

$$\frac{n-1}{\frac{1}{S_1}\left(\frac{\phi_0}{2} - \frac{\phi_1}{2}\right) \times \frac{1}{\frac{\phi_1}{2}}}$$

$$K_1 \times 2nS_1 \times \left(\frac{\phi_1}{\phi_0}\right) < d < K_2 \times 2nS_1 \times \left(\frac{\phi_1}{\phi_0}\right)$$

where in $K_1 = 0.9$, and $K_2 = 1.1$.

In the following there will be given certain numerical examples of the parameters, which, except for the refractive index, are represented in units of millimeters

| | $\phi_0$ | $\phi_1$ | $S_1$ | n | Material | $r_1$ | $r_2$ | d | P |
|---|---|---|---|---|---|---|---|---|---|
| I | 5.43 | 1.68 | 28.2 | 1.720000 | LaK8 | 4.798 | −4.798 | 30 | 1.68 |
| II | 5.04 | 1.68 | 29.1 | 1.51633 | BK7 | 3.756 | −3.756 | 29.4 | 1.68 |

The object fields of the plural element lens systems arranged in parallel with respect to each other in the direction of the optical axis, each lens system having a Gaussian distribution of the intensity in the image plane, can be overlapped with respect to each other by arranging a plurality of such element lens systems along a determined direction with a determined pitch in a plane perpendicular to the optical axis and further making plural rows of such an arrangement. Such rows of element lens systems may be simply arranged in parallel, but are preferably in a so-called staggered arrangement in which each row is displaced by a half pitch with respect to the neighboring row. This improves the uniformity, over the slit length, of the exposure integrated in time in the scanning direction.

The above-mentioned pitch P of the arrangement has a tolerance defined below:

$$M_1 \times \phi_1 < P < M_2 \times \phi_1$$

wherein $M_1 = 0.9$ and $M_2 = 1.5$, though $M_2$ may be selected even larger, if desirable.

Figure 7:
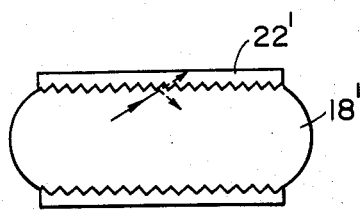
FIG. 7 is a schematic view showing the peripheral absorbing layer of the bar lens of the present invention.

In the case where the bar lens 18' is provided with a minutely coarse surface on the external periphery thereof and with an absorbing layer 22' of a refractive index substantially equal to that of the lens as shown in FIG. 7, it is possible to obtain the desired light intensity of Gaussian distribution. This is possible because the unnecessary beam entering the boundary between the bar lens 18' and the absorbing layer 22' is almost transmitted therethrough, due to the absence of a difference in the refractive index, and attenuated in said absorbing layer 22', and a minor component reflected at said boundary is also attenuated by diffusion.

Figure 8:
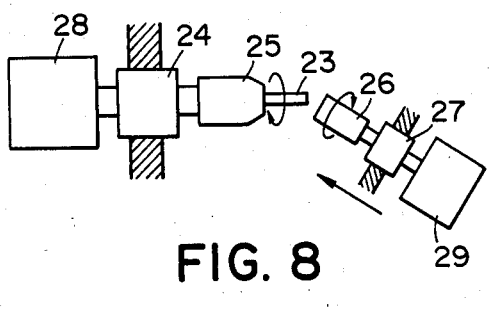
FIG. 8 is a schematic view showing a process for forming a spherical surface in the bar lens of the present invention.

FIG. 8 shows a process for forming the spherical faces of the bar lens, in which a glass fiber rod 23 of which the outer diameter is ground in advance to a precision of ±5 μm is fitted in a collette chuck 25 supported by a high precision bearing 24. Said glass fiber rod 23 may be provided with an external light-shielding treatment, for example with black paint. The holding with said chuck is easily achievable since the bar lens to be finally obtained has a relatively large axial length. Opposed to said glass fiber rod 23 there is provided a working grindstone 26 supported by a high precision bearing 27. 28 and 29 are motors. Said grindstone 26 is of a cylindrical shape for effecting the grinding function with the internal surface thereof and is provided with a rotating axis diagonally crossing the central axis of said glass fiber rod 23.

The glass fiber rod 23 is rotated without vibration by the motor 28 at a low speed, while the grindstone 26 is rotated at a high speed by the motor 29.

Said grindstone 26 is advanced, together with the bearing 27 and the motor 29, along the direction of arrow and is returned to the illustrated position after completing the work to a determined position. In this manner the spherical face at an end is completed. The spherical face at the other end can be obtained in the similar manner. In this process one spherical face is completed as short as ca. 3 seconds, and the centering step can be dispensed with as the eccentricity is determined by the precision of the working machine.

A spherical surface of a large radius of curvature, i.e. requiring a small amount of grinding, may be satisfactorily obtained with a fine grindstone, but it is preferable, for achieving a higher face precision, to employ a coarse grindstone (#400 to #600) and a fine grindstone (#2000 to #3000) in combination.

Figure 9:
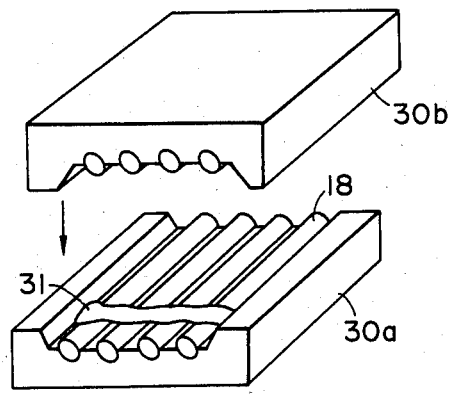
FIGS. 9, 10A, 10B and 11 are views of various embodiments of supporting the plural element lens systems of the present invention in support members.
Figure 10A:
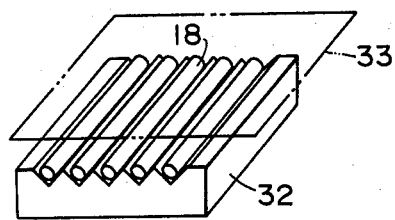
Figure 10B:
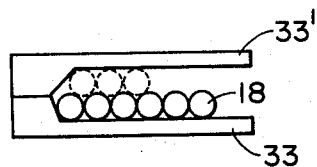
Figure 11:
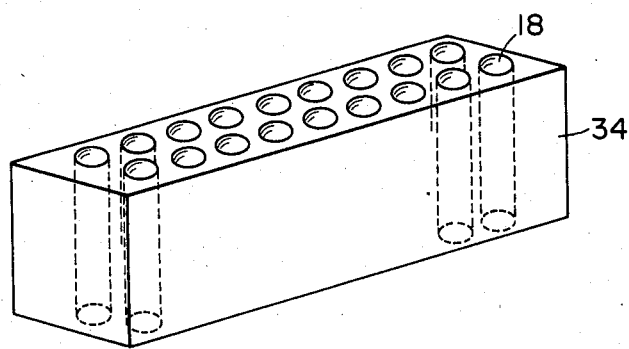

Now reference is made to FIGS. 9 to 11 for explaining the method of supporting the aforementioned element lens systems. In an embodiment shown in FIG. 9, plural element lens systems are arranged in an array and fixed, by means of an adhesive elastomer material, in a grooved block 30a having U-sectioned grooves of a regular pitch, Another grooved block 30b is likewise provided with plural element lens systems, and said grooved blocks 30a and 30b are combined together with an opaque elastomer material 31 as a corking material in the spaces between said element lens systems. The grooves on said block 30a are so positioned as to be displaced by a half pitch from those in said block 30b, whereby said plural element lens systems are arranged in a staggered fashion when seen from the entrance side. Said grooves of the blocks 30a, 30b may also be V-sectioned instead of U-sectioned.

FIGS. 10A and 10B show another embodiment, in which plural bar lenses 18 positioned at a regular pitch on a grooved block 32 are provided with V-sectioned grooves and, after being coated with adhesive elastomer material, are transferred and fixed onto a flat plate 33. After the first row of the array is completed in this manner, a second row is similarly fixed onto a plate 33' and the two rows are combined in such a manner that the bar lenses 18 mutually contact at the outer periphery thereof and constitute a staggered arrangement. The bar lenses in the same row can also be arranged in substantially mutually contacting positions by the appropriate selection of the pitch of grooves.

FIG. 11 shows still another embodiment wherein an integral block 34 is provided with through holes which are arranged in a staggered fashion when seen from the entrance end and which accommodate the bar lenses 18. In this embodiment said block 34 serves as a light-shielding member.

Figure 12:
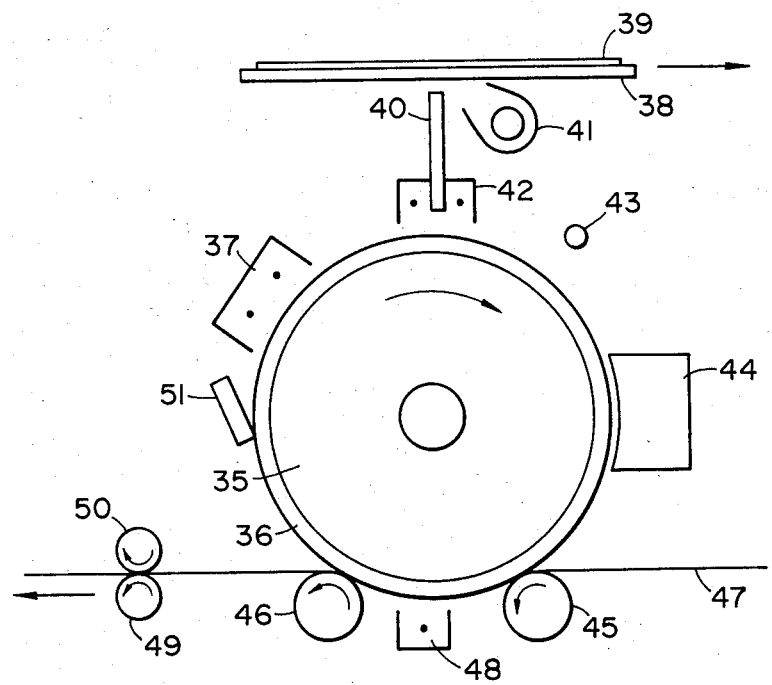
FIG. 12 is a schematic view of a copier in which the projecting device of the present invention is applied.

Now reference is made to FIG. 12 which shows an application of the present invention in a copier, wherein a drum 35 is rotated by motor, not shown, at a constant speed in the direction of the arrow and there is provided on the periphery of the drum a photosensitive member 36 composed, in succession, of a conductive substrate, a photoconductive layer and a surfacial transparent insulating layer. Said photosensitive member 36 is at first uniformly charged, by means of a corona discharger 37, with either positive or negative charge depending on whether said photoconductive material is composed of a N-type of P-type semiconductor, respectively. Subsequently, the photosensitive member 36 is subjected to an imagewise exposure of an original 39 placed on a transparent original carriage 38 which is displaced in the direction of arrow in synchronization with the rotation of said drum 35 and at a speed equal to the peripheral speed of said drum 35 multiplied by the reciprocal of the imaging magnification (i.e. at the peripheral speed in case the magnification is unity), said image being focused onto said photosensitive member 36 by means of a projecting lens array 40. An area of the original 39 opposed to the lens array 40 (i.e. an area to be imaged on said photosensitive member 36), is illuminated by an illuminating unit composed of a lamp and a reflector. The amount of exposure to said photosensitive member 36 can be adjusted, for example, by regulating the amount of illumination.

Simultaneous with said imagewise exposure by said lens array 40, the photosensitive member 36 is subjected to a charge elimination by means of a corona discharger 42 having a polarity opposite to that of the aforementioned corona discharger 37, thereby forming a charge pattern on said photosensitive member 36 corresponding to the image on said original 39. Said photosensitive member 36 is further subjected to a uniform exposure by a lamp 43 to form thereon an electrostatic latent image having an elevated contrast. The latent image thus formed is rendered visible as a toner image in a developing station 44 which, for example, utilizes cascade development or magnet brush development. Subsequently said toner image is transferred onto a transfer sheet 47 which is supplied from supply means, not shown and is maintained on contact with the photosensitive member 36 by means of rollers 45, 46 and which advance at the same speed as that of said photosensitive member 36. In order to improve the transfer efficiency, said transfer sheet 47 is given, on the back side thereof at the transfer position, a charge of a polarity opposite to that of the developing toner by means of a corona discharger 48. The transfer sheet is advanced to a storage means, not shown, after said toner image thereon is fixed in a suitable fixing station, for example, a heat fixer provided with paired rollers 49, 50 maintained in pressure contact with the transfer sheet 47.

The photosensitive member after the image transfer is subjected to a cleaning step having an elastic blade 51 maintained in pressure contact with said photosensitive member for removing the eventually remaining toner particles, and is again used for the succeeding imaging cycle. In the foregoing explanation the discharger 42 is so positioned as to effect the charge elimination of the surface of the photosensitive member 36 simultaneously with the imagewise exposure, but it may also be positioned between the discharger 37 and the imaging system to effect the charge elimination prior to the imagewise exposure. In such case it is possible to dispense with the lamp 43. Also the photosensitive member 36 may be of a type not provided with the surfacial insulating layer. In such a case the discharger 42 and the lamp 43 are no longer necessary.

As explained in the foregoing, the present invention provides a projecting device having stable optical performance, an easy optical adjustment and a short conjugate distance adapted for use in a compact copier or the like.

What we claim is:

1. A projecting device, comprising:
   plural lenses arranged in parallel with respect to each other in the direction of the optical axis, each of said lenses being a single bar lens having a uniform index of refraction and an axial length larger than an effective aperture thereof, said single bar lens being adapted for projecting, after forming an inverted intermediate image perpendicular to the optical axis at the intermediate position of said lens, a pixel of an object plane as a pixel of an erect image having a magnification of unity, wherein each lens satisfies the following three inequality relations:

$$K_1 \times \frac{n-1}{\frac{1}{S_1}\left(\frac{\phi_0}{2} - \frac{\phi_1}{2}\right) \times \frac{1}{\frac{\phi_1}{2}}} < r_1 < K_2 \times \quad (1)$$

$$\frac{n-1}{\frac{1}{S_1}\left(\frac{\phi_0}{2} - \frac{\phi_1}{2}\right) \times \frac{1}{\frac{\phi_1}{2}}}$$

$$-K_2 \times \frac{n-1}{\frac{1}{S_1}\left(\frac{\phi_0}{2} - \frac{\phi_1}{2}\right) \times \frac{1}{\frac{\phi_1}{2}}} < r_2 < -K_1 \times \quad (2)$$

$$\frac{n-1}{\frac{1}{S_1}\left(\frac{\phi_0}{2} - \frac{\phi_1}{2}\right) \times \frac{1}{\frac{\phi_1}{2}}}$$

$$K_1 \times 2nS_1 \times \frac{\phi_1}{\phi_0} < d < K_2 \times 2nS_1 \times \frac{\phi_1}{\phi_0} \quad (3)$$

wherein:
   $r_1$ and $r_2$: radii of curvature of the first and second faces, respectively, of the lens;
   $d$: axial thickness of the lens;
   $n$: refractive index of the lens;
   $\phi_1$: effective aperture of the lens;

$\phi_0$: maximum diameter of the effective object field;
$S_1$: distance from the first face of the lens to the object plane; and
$K_1$: 0.9 and $K_2 = 1.1$.

2. A projecting device according to the claim 1, wherein said lenses are arranged in rows and in a staggered fashion in which each row of lenses is displaced by a half pitch with respect to the neighboring row when seen from the light entrance end.

3. A projecting device according to claim 1, wherein each of said lenses has absorbing material surrounding said lens in the lengthwise direction of said lens.

4. The projecting device according to claim 3, wherein a pixel of an object plane uniformly illuminated is projected as an image of the pixel having a Gaussian distribution of light intensity and wherein adjacent pixel images overlap in the peripheral areas thereof on the image plane to make a predetermined distribution of light intensity.

5. A projecting device according to claim 3, wherein said absorbing material includes an elastomer material.

6. A projecting device according to claim 3, wherein said lenses are arranged in rows, and wherein a first row of said rows is supported by a first grooved block having a plurality of grooves, each of a regular pitch.

7. A projecting device according to claim 6, wherein a second row of said rows is arranged in tangential contact with said first row.

8. A projecting device according to claim 6, wherein a second row of said rows is supported by a second grooved block having a plurality of grooves, each of a regular pitch.

9. A projecting device according to claim 3, wherein said lenses are arranged in rows, and wherein a first row of said rows is supported on a first flat plate.

10. A projecting device according to claim 9, wherein a second row of said rows is arranged in tangential contact with said first row.

11. A projecting device according to claim 3, wherein said lenses are arranged in rows and in a staggered fashion in which each row of lenses is displaced by a half pitch with respect to the neighboring row when seen from the light entrance end.

* * * * *